US008804516B2

(12) United States Patent  (10) Patent No.: US 8,804,516 B2
Matheney et al.  (45) Date of Patent: Aug. 12, 2014

(54) OPPORTUNISTIC TRANSMISSIONS WITHIN MOCA

(75) Inventors: Jack Thomas Matheney, Madison, AL (US); Jeffrey Scott Ford, Madison, AL (US); Albert L. Garrett, Gadsden, AL (US)

(73) Assignee: Cisco Technology, Inc., San Jose, CA (US)

( * ) Notice: Subject to any disclaimer, the term of this patent is extended or adjusted under 35 U.S.C. 154(b) by 419 days.

(21) Appl. No.: 12/616,310

(22) Filed: Nov. 11, 2009

(65) Prior Publication Data

US 2010/0142378 A1  Jun. 10, 2010

Related U.S. Application Data

(60) Provisional application No. 61/119,752, filed on Dec. 4, 2008.

(51) Int. Cl.
*H04L 12/26* (2006.01)
*H04W 72/12* (2009.01)

(52) U.S. Cl.
CPC .................................... *H04W 72/12* (2013.01)
USPC ....................................................... 370/235

(58) Field of Classification Search
USPC .......... 370/395.1–395.41, 389–400, 203–235
See application file for complete search history.

(56) References Cited

U.S. PATENT DOCUMENTS

| | | | |
|---|---|---|---|
| 6,947,409 B2 | 9/2005 | Iwamura | |
| 7,411,975 B1 | 8/2008 | Mohaban | |
| 7,606,256 B2 | 10/2009 | Vitebsky et al. | |
| 7,697,522 B2 | 4/2010 | Kliger et al. | |
| 7,782,897 B1 | 8/2010 | Mohaban | |
| 7,813,261 B2 * | 10/2010 | Ma et al. | 370/203 |
| 7,817,642 B2 * | 10/2010 | Ma et al. | 370/395.4 |
| 8,085,802 B1 | 12/2011 | Monk et al. | |
| 8,228,910 B2 * | 7/2012 | Wu et al. | 370/389 |
| 2003/0079000 A1 | 4/2003 | Chamberlain | |
| 2005/0141420 A1 * | 6/2005 | Li et al. | 370/230 |
| 2005/0254459 A1 * | 11/2005 | Qian | 370/328 |
| 2006/0062192 A1 * | 3/2006 | Payne, III | 370/338 |
| 2006/0248429 A1 * | 11/2006 | Grandhi et al. | 714/749 |
| 2007/0201364 A1 * | 8/2007 | Nakajima et al. | 370/230 |
| 2008/0117919 A1 * | 5/2008 | Kliger et al. | 370/400 |
| 2009/0180430 A1 | 7/2009 | Fadell | |
| 2009/0279673 A1 | 11/2009 | Maffre et al. | |
| 2010/0061403 A1 | 3/2010 | Mueller | |
| 2010/0082791 A1 * | 4/2010 | Liu et al. | 709/223 |
| 2010/0142540 A1 | 6/2010 | Matheney et al. | |
| 2010/0146616 A1 | 6/2010 | Garrett et al. | |
| 2010/0229015 A1 | 9/2010 | Hebron et al. | |

OTHER PUBLICATIONS

U.S. Appl. No. 12/616,356, filed Nov. 11, 2009, entitled "Efficient Data Transmission within MOCA", inventor: Matheney et al.

(Continued)

*Primary Examiner* — Kwang B Yao
*Assistant Examiner* — Juvena Loo
(74) *Attorney, Agent, or Firm* — Merchant & Gould

(57) ABSTRACT

Embodiments may be disclosed herein that provide systems, devices, and methods of operating a Multimedia over Coax (MoCA) network. One such embodiment is a method comprising: aggregating packets, including at least control packets and acknowledgement packets, with other packets.

20 Claims, 11 Drawing Sheets

(56) References Cited

OTHER PUBLICATIONS

U.S. Appl. No. 12/616,333, filed Nov. 11, 2009, entitled "Cooperation for Consumer and Service Provider MOCA Networks", inventor: Garrett et al.

Moca Multimedia over Coax Alliance, IPTV White Paper, The Standard for Home Entertainment Networks over Coax™, Jun. 2008, pp. 1-10.

U.S. Office Action mailed Jun. 11, 2012 in U.S. Appl. No. 12/616,356, 16 pages.

U.S. Office Action mailed Oct. 5, 2012 in U.S. Appl. No. 12/616,333, 13 pages.

U.S. Office Action mailed Nov. 6, 2012 in U.S. Appl. No. 12/616,356, 15 pages.

* cited by examiner

OPPORTUNISTIC TRANSMISSIONS WITHIN MOCA

FIELD OF THE DISCLOSURE

The present disclosure relates to operation of multiple MoCA networks, specifically the aggregation of data transmissions.

BACKGROUND

Prior MoCA solutions may not allow for leveraging previously scheduled transmissions. A solution is needed to avoid costly dedicated transmissions. For example, reservation requests, which may be relatively small, are sent via dedicated transmissions in prior MoCA solution. A system is needed that can aggregate transmissions destined to different nodes to provide for the more efficient transmission of small packets.

BRIEF DESCRIPTION OF THE DRAWINGS

The accompanying drawings, which are incorporated herein constitute a part of this disclosure, illustrate various embodiments of the present invention. In the drawings.

Figure 1:
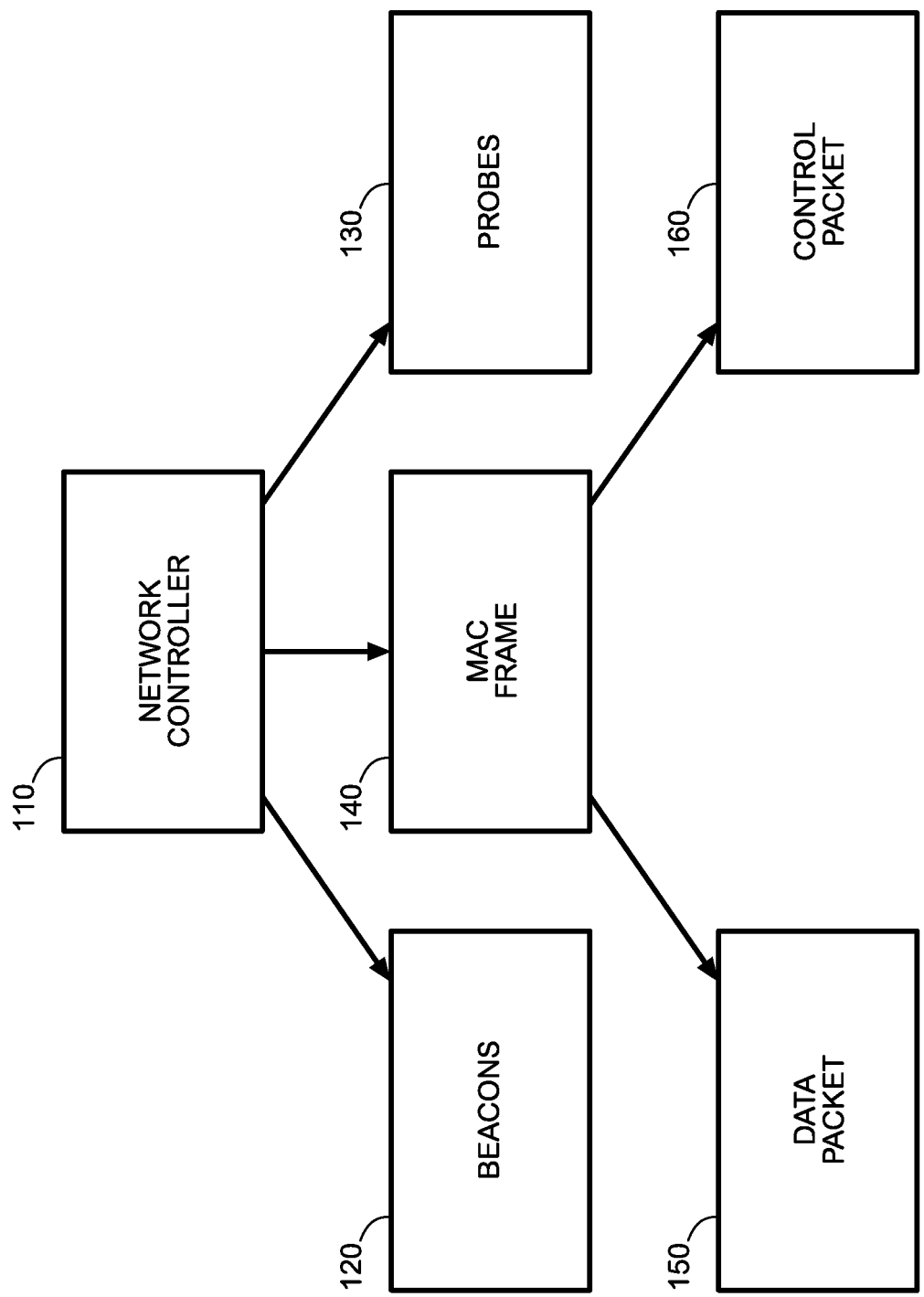
FIG. 1 illustrates basic transmissions in a functional operating embodiment of the present invention.

Both the foregoing general description and the following detailed description provide examples and are explanatory only. Accordingly, the foregoing general description and the followed detailed description should not be considered to be restrictive. Further, features or variations may be provided in addition to those set forth herein. For example, embodiments may be directed to various feature combinations and subcombinations described in the detailed description.

DETAILED DESCRIPTION

The following detailed description refers to the accompanying drawings. Wherever possible, the same reference numbers are used in the drawings and the following description to refer to the same or similar elements. While embodiments may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the invention. Instead, the proper scope of the invention is defined by the appended claims.

The Multimedia over Coax Alliance "MoCA" is an open, industry driven initiative promoting distribution of digital video and entertainment through existing coaxial cable in the home. MoCA technology may provides the backbone for whole home entertainment networks of multiple wired and wireless products. A medium access control ("MAC") protocol may be employed in technology such as MoCA. The MAC protocol may be based on time division multiple access "TDMA". TDMA is digital transmission technology that may allow a number of users to access a single channel without interference by allocating unique time slots to each user within each channel.

TDMA may utilize Carrier Sense Multiple Access "CSMA" periods to improve minimum latency performance. The network may be a distributed network wherein one of the nodes may be automatically selected to be the network coordinator. The network coordinator may be responsible for generating the timing and resource allocation for the entire network.

MoCA may suffer from issues relating to the inefficient transmission of small packets. First, MAC efficiency may be limited by the number of reservation request opportunities that must be allocated during each MAC cycle. Since MoCA may utilize a fully scheduled TDMA access scheme, the number of reservation request opportunities per MAC cycle may be determined largely by the number of nodes on the network. As a result, the MAC cycle may support data traffic transmission only a fraction of the MAP cycle. This fraction of the MAP cycle dedicated to data transmission may be viewed as the MAC efficiency.

Embodiments may be disclosed herein that provide systems, devices, and methods of operating a Multimedia over Coax (MoCA) network. One such embodiment is a method comprising: aggregating packets, including at least control packets and acknowledgement packets, with other packets.

Some embodiments may include a method of operating a MoCA network, comprising: aggregating MoCA control packets and small Ethernet PDU packets; and communicating a broadcast bit to indicate whether the network is operating in broadcast or unicast mode.

Some embodiments may include a MoCA network, comprising: a first node on a MoCA network; a second node on a MoCA network; and a network controller in communication with the first node and the second node capable of aggregating packets, including at least control packets and acknowledgement packets, with other packets destined for either the first node or the second node.

FIG. 1 illustrates basic transmissions in a functional operating embodiment of the present invention. A plurality of MoCA transmissions may be sent from network coordinator 110. To facilitate admission, beacons 120 may be transmitted from network coordinator 110 at fixed intervals. Beacons 120 may be messages which contain basic information for the network's operation. In some embodiments beacon 120 messages may be 256 bit protocol fields with an appended 32 bit Cyclic Redundancy Check "CRC".

In some embodiments, network controller may transmit probes 130. Probes 130 may include link probes of various types. Link probe signals may be periodically sent to the MoCA nodes to determine frequency response at each of the Orthogonal Frequency Division Multiplexing ("OFDM") subcarrier frequencies. Because the electrical characteristics of the plant may change when a subscriber adds or removes devices, probes may be sent on a periodic basis, and the OFDM scheme may be changed as required.

MAC protocol 140 may transmit both data packets 150 and control packets 160. In some embodiments, MAC protocol 140 transmits MAC PDU packets. The MAP PDU packets may contain 144 bit headers appended to a variable length payload, which may be subsequently appended to a 32 bit CRC. Control packets 160 may be used to control system operations. For example, control packet 160 may be a MAP transmission opportunity request. In some embodiments, this request may be asynchronous.

In some embodiments, control packet 160 may comprise link maintenance operation messages. Such messages may include, but are not limited to, link probe reports, link probe report requests, admission requests, admission responses, acknowledgements, power control messages, power control responses, power control acknowledgements, power control updates, periodic link packets, and unicast MAC addresses. In some embodiments, control packet 160 may be a reservation request or a bandwidth request. In some embodiments, control packets 160 may be used for the distribution of secure keys and dynamic keys.

Data packets 150 may transport upper layer information across the network. In some embodiments, every node on the MoCA network may have a clock reference time synchronized to system time stamps provided by network coordinator 110.

The MoCA network may be a frequency agile RF network. A node may power up and attempt to find an existing network to join only to be unable to find an existing network. In such a scenario, the node may attempt to establish a new node in an available frequency band. A new node wishing to join the MoCA network may go through an admissions process as illustrated below.

A node may wish to request for admission on a MoCA network. The node may then find and decode a beacon 120 being transmitted by network coordinator 110. Once a beacon 120 is located, the node may synchronize its MAC timing with the timing of network coordinator 110. Once timing has been synchronized with the node, the node may transmit an admission request to network coordinator 110. In some embodiments, a backup network controller may be designated in case of failure of network controller 110.

Probes may then be exchanged between the node and network coordinator 110. A modulation profile may then be created between the node and network coordinator 110. Modulation profiles may also be created between the node and all other existing nodes on the MoCA network.

In some embodiments, network coordinator 110 may control all transmissions on the network by broadcasting transmission opportunities to all nodes in MAP control packets. A MAP may contain transmit opportunity assignments for a set period of time. MAPs may identify the start time and the transmission type of each transmission opportunity. When the transmission type may be identified as TDMA, the MAP may further provide the duration, profile and source and destination nodes. When the transmission type may be identified as CSMA, the MAP may further provide CSMA duration, slot schedule and source node. In some embodiments, MAPs may also identify the transmit time of the next MAP and beacon 120 if it falls in the next MAP cycle.

If a node is admitted to the MoCA network, it may waits for one of two events if the mode wishes to transmit data. If guaranteed performance is required, the admitted node may wait for a reservation request transmit opportunity in a MAP and subsequently transmit a bandwidth request to network coordinator 110. The node may use this transmission opportunity to send a data packet to its destination node. The destination node may also recognize the transmit opportunity in the MAP and may be prepared to receive and process the data packet.

If only best effort performance is required, the admitted node may wait for a Dedicated Contention-Free Period "DCFP" within the CSMA transmission opportunity. The node may use this transmission opportunity to send a data packet to its destination node. The destination node may also recognize the time slot in the CSMA transmission opportunity and may be prepared to receive and process the data packet.

Figure 2:
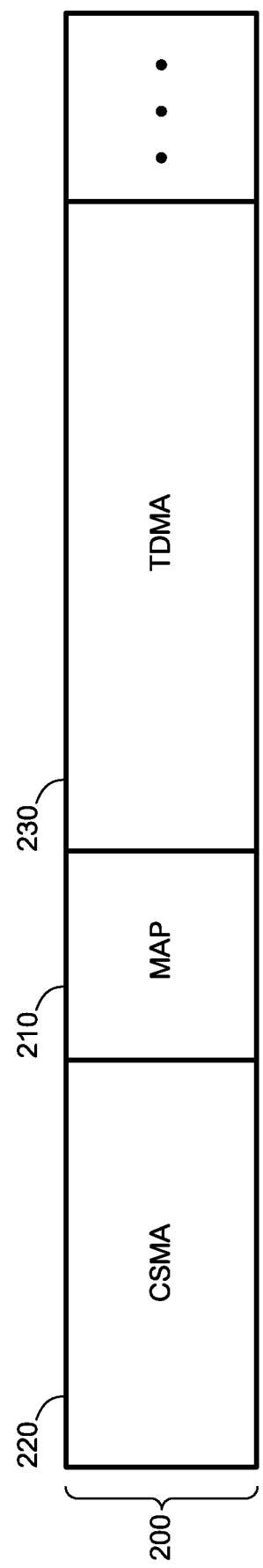
FIG. 2 illustrates embodiments of a MAP cycle according to embodiments of the present invention.

FIG. 2 illustrates embodiments of a MAP cycle according to embodiments of the present invention. MAP cycle 200 may represent a single MAP cycle operating on a MoCA network. A portion of MAP cycle 200 prior to MAP packet 210 may be dedicated to reservation requests and small data packets. This prior portion may be a first CSMA period 220. A portion of MAP cycle 200 after MAP packet 210 may be dedicated to data traffic as illustrated by TDMA block 230.

Figure 3:
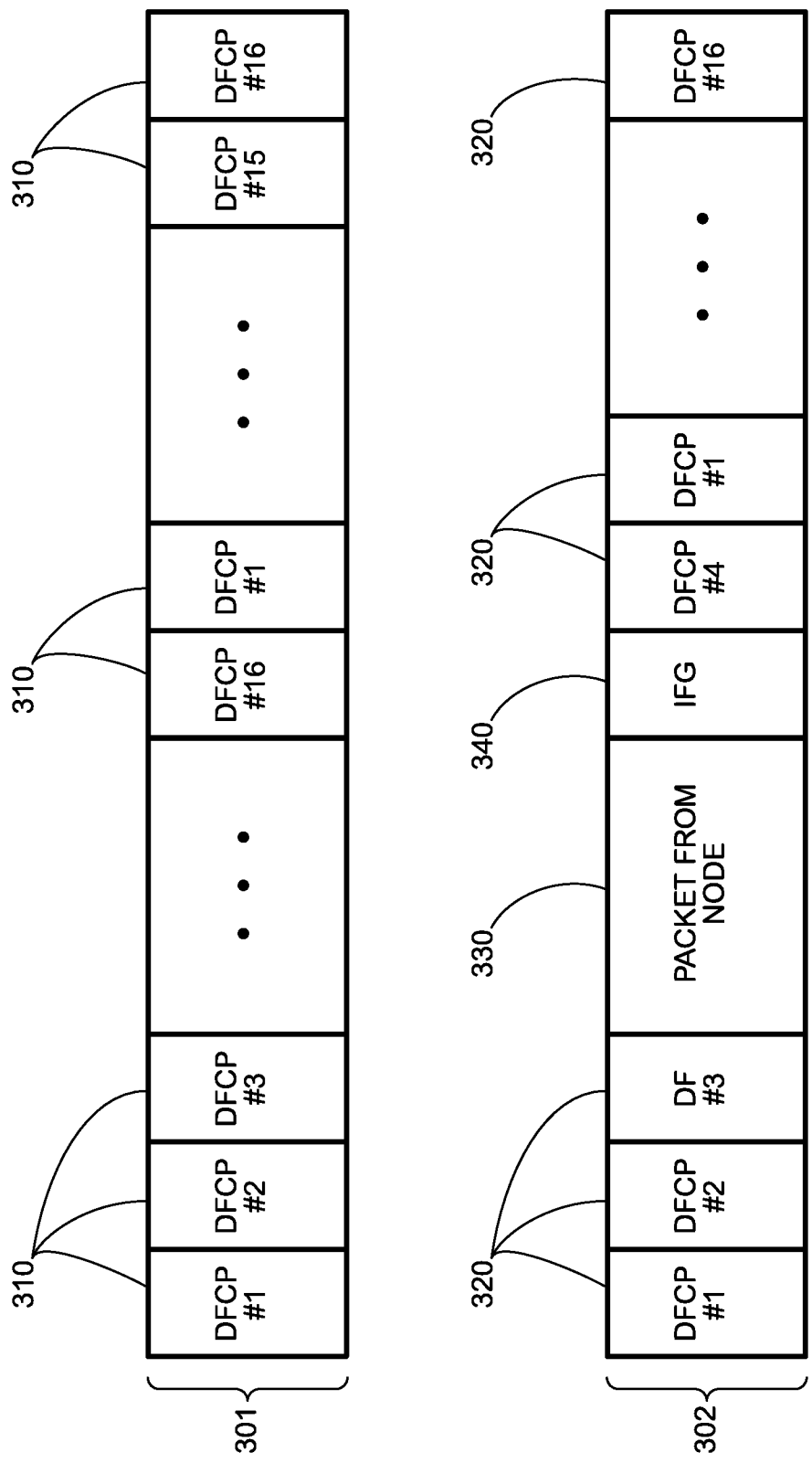
FIG. 3 illustrates a CSMA period with scheduled subslots according to embodiments of the invention.

FIG. 3 illustrates a CSMA period with scheduled subslots according to embodiments of the invention. Illustrated CSMA period 301 may operate in an uninterrupted transmission plan. CMSA period 301 may be made up of any number of DCFPs, such as DCFP 310. Each DCFP 310 may represent an opportunity for a node to transmit. CSMA period 310 may comprise one or more DCFPs 310. The sequence of DCFP 310 numbers may be indicated by network coordinator 110 in the MAP of the previous MAP cycle. DCFP numbers may correspond to MoCA node IDs.

Each DFCP 310 may be owned by a node which is scheduled to use DCFP 310 based on the sequence of DCFP 310 numbers received from network coordinator 110. Each DCFP 310 may be allotted a set period of time in which to allow the DCFP 310 owner node to begin transmission and for other nodes to prepare for another DCFP 310 when an uninterrupted schedule is employed. In some embodiments, the time period may be between 5.12 and 15.36 us. A DCFP 310 schedule may be uninterrupted if a scheduled DCFP 310 is not utilized by the DCFP 310 owner. As a result, the next DCFP 310 may occur as scheduled and may be used by the next node according to a DCFP plan.

Alternatively, CSMA period 302 may illustrate an interrupted operating plan. A DCFP 320 schedule may be interrupted if a scheduled DCFP 320 may be utilized by the DCFP 320 owner. As a result, the next DCFP 310 is deferred until the completion of the current transmission of packet 330 and the required Interframe Gap "IFG" period 340. Specific rules may be defined to determine the next DCFP 320 for use in CMSA period 302.

Figure 4:
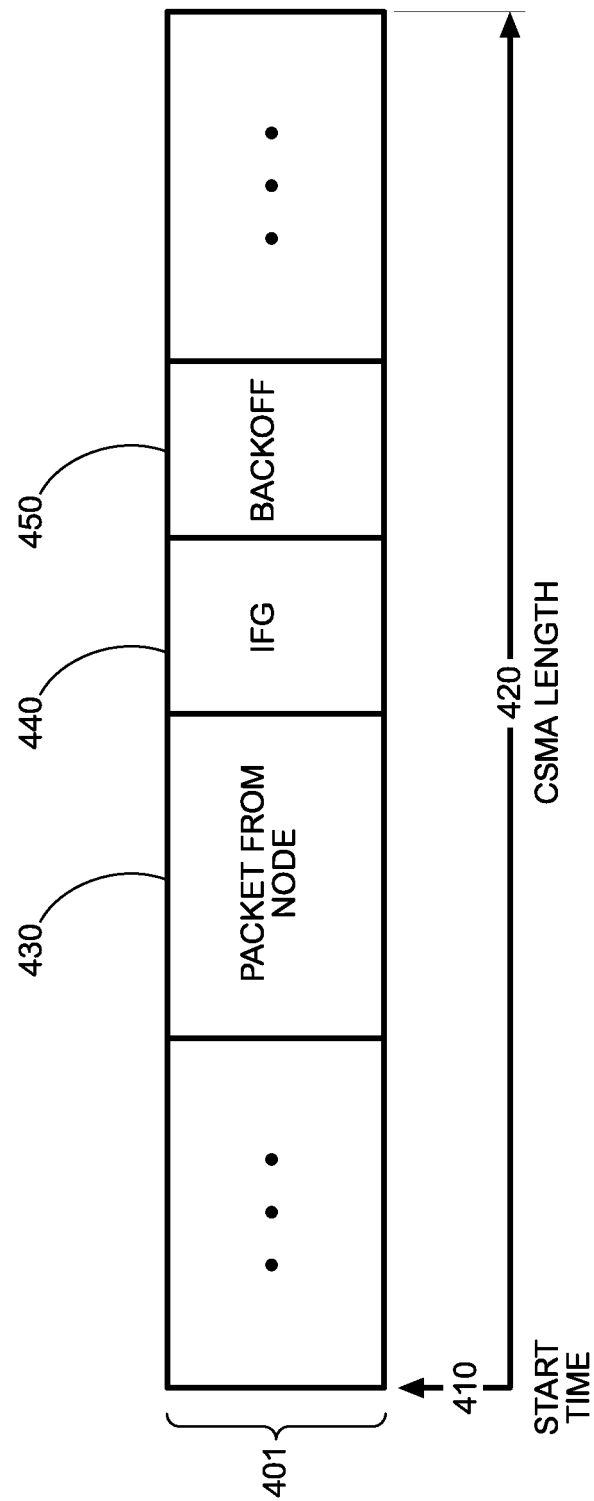
FIG. 4 illustrates a CSMA period with unscheduled subslots according to embodiments of the invention.

FIG. 4 illustrates a CSMA period with unscheduled subslots according to embodiments of the invention. Illustrated CSMA period 401 may be bounded by a starting time 410 and a determined length 420. If a node wishes to transmit a packet 430, the node may first verify that the carrier is clear. This verification may be achieved by determining if the desired media is in use by another node. Once the verification is made, the node may transmit a packet. Prior to transmittal of the packet, the node may ensure that the packet start time plus the packet length will not exceed the CSMA period 401 start time plus CMSA period 410 length.

If it is determined that the desired media may be in use by another node, the node may then determine whether a virtual MoCA network may be available by decoding a packet header. The node may then defer transmitting the packet until the media packet's use is completed. The node may further defer for the IFG period 440. After IFG period 440, the node may wait for an additional back-off period 450. Back-off period 450 may be of a random length. Once back-off period 450 expires, the node may return to verify that the carrier is clear in the subsequent CSMA period 401.

Figure 5:
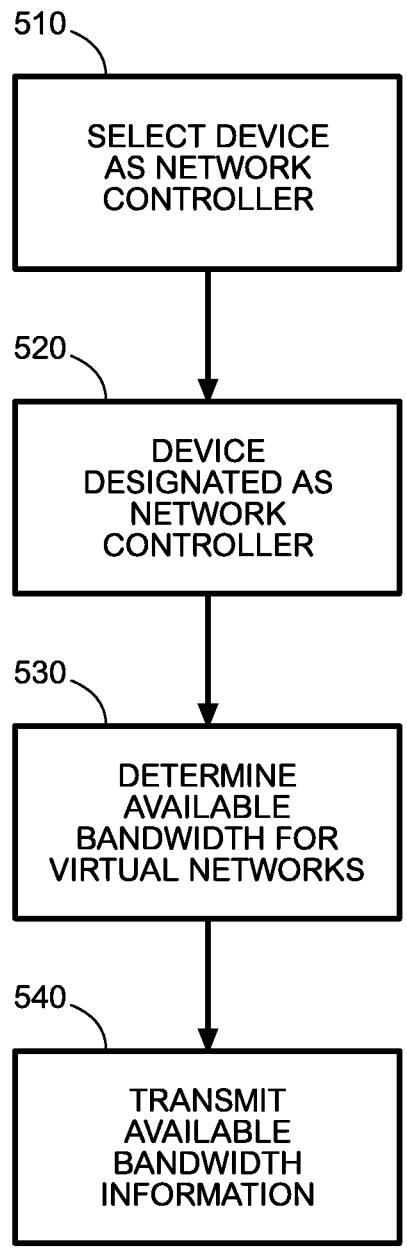
FIG. 5 illustrates a flow chart of embodiments of the present invention.

FIG. 5 is a flow chart illustrating embodiments of the present invention. The method begins at step 510, where a MoCA device may be selected as a network controller. This selection may be made by a service operator. The method may then proceed to step 520, where the selected MoCA device may be designated in the network as a network controller. In some embodiments, the network controller may be a service provider device.

Once a network controller has been designated, the method may proceed to step 530, where the network may determine the predetermined bandwidth reserved for virtual MoCA networks. The bandwidth information may have been previously established through the application of bandwidth allocation rules. In some embodiments, the bandwidth allocation rules may be established by a service provider.

When the predetermined bandwidth is determined, the method may proceed to step 540 where the network controller may transmit beacons containing the virtual information, including allotted bandwidth. This allows the logical partitioning of the virtual MoCa networks.

Figure 6:
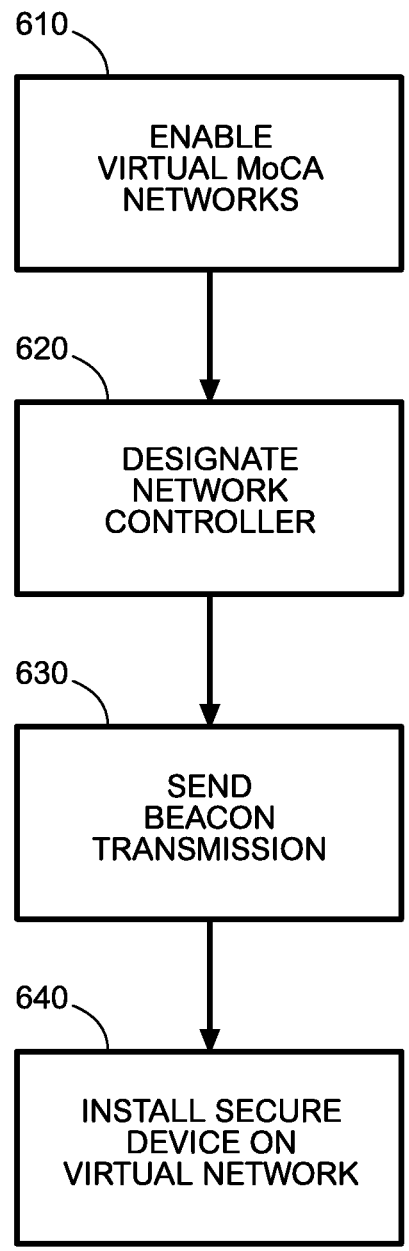
FIG. 6 is a flow chart illustrating embodiments of the present invention.

In some embodiments, the network controller may send a single beacon containing information for all virtual networks on the MoCA network. In some embodiments, the network controller may send one beacon for each virtual network on the MoCA network containing information specific to each virtual network FIG. 6 is a flow chart illustrating embodiments of the present invention. The method begins at step 610, where a plurality of virtual MoCA networks may be enabled. In some embodiments, the plurality of virtual MoCa networks may reside on a single physical channel. Once the virtual networks are enabled the method may proceed to step 620, where a selected MoCA device may be designated as a network controller.

When a network controller has been designated, the method may proceed to step 630. At step 630, the network controller may send a beacon transmission to one or more MoCA devices. In some embodiments, the MoCA device may be scanning for beacon transmissions on usable MoCA channels. The beacon transmission may serve to activate the enabled virtual MoCA networks by providing bandwidth availability information.

Once the virtual MoCA networks are activated, the method may proceed to step 640 where one or more secure network devices may be installed to one of the virtual MoCA networks. The secure network device may be installed by a consumer. In some embodiments, the beacon transmission may contain security information to alert the secure network device whether or not access is provided to an associated virtual MoCA network. The security information may comprise defined rules which determine which among a plurality of available virtual MoCA networks the secure network device will be installed to.

MoCA may suffer from issues relating to the inefficient transmission of small packets. First, MAC efficiency may be limited by the number of reservation request opportunities that must be allocated during each MAC cycle. Since MoCA may utilize a fully scheduled TDMA access scheme, the number of reservation request opportunities per MAC cycle may be determined largely by the number of nodes on the network. As a result, the MAC cycle may support data traffic transmission only a fraction of the MAP cycle. This fraction of the MAP cycle dedicated to data transmission may be viewed as the MAC efficiency.

Small packets which may be transmitted in MoCA may not be efficient in the physical layer. Although data sizes less than 100 bytes may require less than one Orthogonal Frequency Division Multiplexing "OFDM" symbol for transmission, the medium utilization may be determined by the preamble and IFG period which may exceed 30 us. Resultantly, the corresponding MAC rate may be less than 20 Mbps.

MoCA may be unable to achieve sufficient round trip times for traffic that utilizes application layer acknowledgements. Applications such as DTCP-IP and transport traffic using TCP/IP may depend on acknowledgements to verify reception. The latency from transmission of a packet to receipt of the acknowledgement may be a critical parameter for the achievable throughput performance of the traffic.

For example, if a node has only a TCP ACK to transmit, the node must first wait for a request reservation opportunity. Such an opportunity may require a wait of 2 ms. Once the opportunity may occur the reservation request may be made. Once the reservation request is made, the node may wait for the granting of the reservation request. The granting of the reservation request may take about 1 ms. After the granting of the reservation request, the node may send an acknowledgement as a unicast packet to the node. In some cases where the network coordinator is the node to which the acknowledgement is destined, 1 ms of latency may be removed by sending the acknowledgement during the reservation request.

In another example, if a node already has a packet to transmit, the node may wait for a request reservation opportunity. Such an opportunity may require a wait of 2 ms. Once the opportunity may occur the reservation request may be made. Once the reservation request is made, the node may wait for the granting of the reservation request. The granting of the reservation request may take about 1 ms. After the granting of the reservation request, the node may send the packet as a unicast packet to the node. In some cases, significant latency may be removed by sending the reservation request when a packet destined to the network coordinator is in process.

In light of these and other issues, MoCA MAC may desire to be more strategic in the transmission of small packets. The transmission may avoid the efficiency penalty incurred when only a small packet is transmitted and may avoid the delay caused by bandwidth negotiations. The aggregation of data packets may be employed to achieve improved performance for small packet transmissions.

In some embodiments, the present invention may aggregate data with a reservation request or a MAP frame. When a node may be ready to transmit a reservation request to the network coordinator, there may only be a short Ethernet Protocol Data Unit "PDU" available. Prior systems may aggregate the packets only if the packets are Ethernet PDUs destined to the same node and the same priority level. This may constrain the performance of the system.

A solution to the performance constraint may allow for the encapsulation of small data packets into the protocol information element. Alternatively, or in combination, aggregation may be extended to include MoCA control packets and small Ethernet PDU packets. The packets may be of a size less than or equal to 252 bytes. The latency of the small packets may be improved by appending the small packets to reservation requests that have already been scheduled. MAC efficiency may be improved if a device is allowed to aggregate reservation requests with Ethernet PDUs.

As a result, the dedicated transmission opportunity for a reservation request can be avoided. This may increase the MAC efficiency and may improve the latency of other nodes on the network. The improved latency for nodes may be achieved indirectly as the time that would have been dedicated to a single reservation opportunity for the node may now be allocated to a different node that may have been waiting for the opportunity.

The system may contain a processor capable of determining whether a node is capable of aggregating control packets and data packets. Furthermore, the system may contain a processor capable of determining whether a node may support utilizing PDUs.

In some embodiments, the present invention may aggregate control and data packets to the network coordinator. A node may have a data packet scheduled for transmission. The node may also be aware that another transmission opportunity may be required. In prior systems, the node may have to wait for bandwidth negotiation opportunities with the network coordinator. However, this may be wasteful if the packet is destined for the network coordinator. This waste may be avoided by aggregating the reservation request information with the Ethernet PDU to be transmitted.

In some embodiments, the present invention may aggregate data packets destined for the same node. The data packets may have different priorities. In prior systems, the node would not be allowed to aggregate the packets into a single transmission. It may have been required to request two separate transmission opportunities for the packets. This approach may prevent a low priority flow from inheriting the priority of a higher priority flow and pre-empting other high priority packets. In the present invention, data packets destined for the same node may be aggregated regardless of priority, provided that the lower priority Ethernet PDU may be less than 256 bytes.

In some embodiments, the present invention may allow for the aggregation of control packets with data packets. In prior systems, the node may be required to wait for bandwidth negotiation opportunities with the network coordinator. As a result, the medium may be occupied with the current packet transmission, and then may subsequently occupied with a reservation request for the next packet transmission. The latency of the overall system may be improved with embodiments of the present invention.

Figure 7:
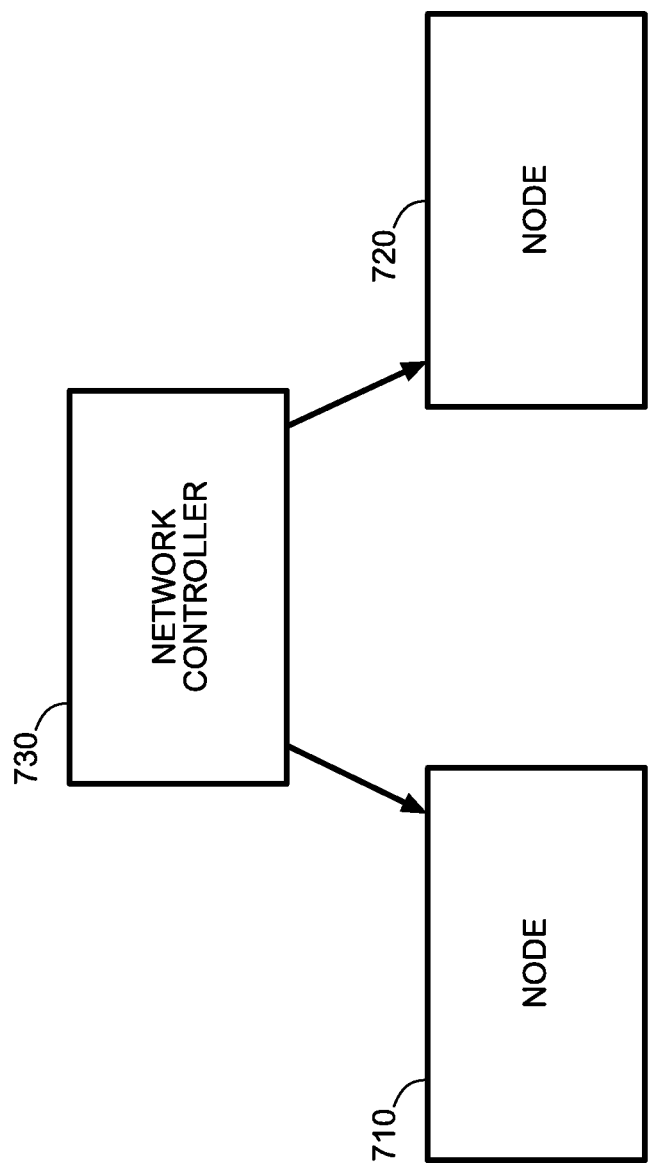
FIG. 7 illustrates an embodiment of the present invention.

FIG. 7 illustrates an embodiment of the present invention. For example, nodes 710 and 720 may be communicating at a rate of 100 Mbps with average packet sizes of 1518 bytes. Node 710 may communicate with the network coordinator 730 at the same rate. The medium may be occupied for 150 us due to each PDU transmission. The medium may be occupied for 40 us for the reservation request. The transmission of the second PDU may be delayed for a minimum of 2 ms while awaiting a reservation request opportunity and a bandwidth grant. As a result, the system may afford to transmit the Ethernet PDU in broadcast mode without experiencing a system throughput degradation if it may utilize a broadcast bitload for the transmission and the broadcast bit load rate is approximately 150/190 times the unicast bit load rate or greater. This may improve the overall latency of the system.

When broadcast transmission may be required, node 710 may aggregate the two packets. A broadcast bit may be loaded to transmit the aggregated frame destined for a plurality of nodes. The broadcast bit may be communicated to network coordinator 730 to alert network coordinator 730 that a frame may be transmitted in a broadcast or a unicast mode. Node 710 may communicate in the reservation request 1) that the transmission will be a broadcast transmission; 2) a length sufficient for the data packet and the aggregated control packet; and 3) a plurality of nodes that must listen to the transmission. Network coordinator 730 may use this information to determine MAP allocations and may transmit a MAP with corresponding allocation units. Within the allocation unit for this transmission, network coordinator 730 includes 1) that the transmission will be a broadcast transmission; 2) a length sufficient for the data packet and the aggregated control packet; and 3) a plurality of nodes that must listen to the transmission.

In some embodiments, the present invention may provide for the aggregation of data packets with control packets where the packets are destined for different nodes. For example, node 710 may have a data packet destined for node 720 and a control packet, such as a reservation request, destined for network coordinator 730. In prior systems, the two transmissions may occur separately. This may be wasteful as the reservation request could be 16 bytes long and require much less than one OFDM symbol for transmission. In some embodiments of the present invention, when node 710 has two packets waiting for transmission, the system may determine whether the best strategy to conserve media bandwidth is aggregation and broadcast transmission or multiple unicast transmissions.

In some embodiments, network coordinator 730 may be employed as a relay node in the MoCA network. Node 710 may determine that aggregation of a packet with other packets will result in worse performance due to the differences between unicast and multicast profiles. Node 710 may request network coordinator 730 to relay the message to destination node 720. This may be beneficial when TCP traffic is being sent to destination node 720. However, destination node 720 may not be transmitting packets to source node 710.

Figure 8:
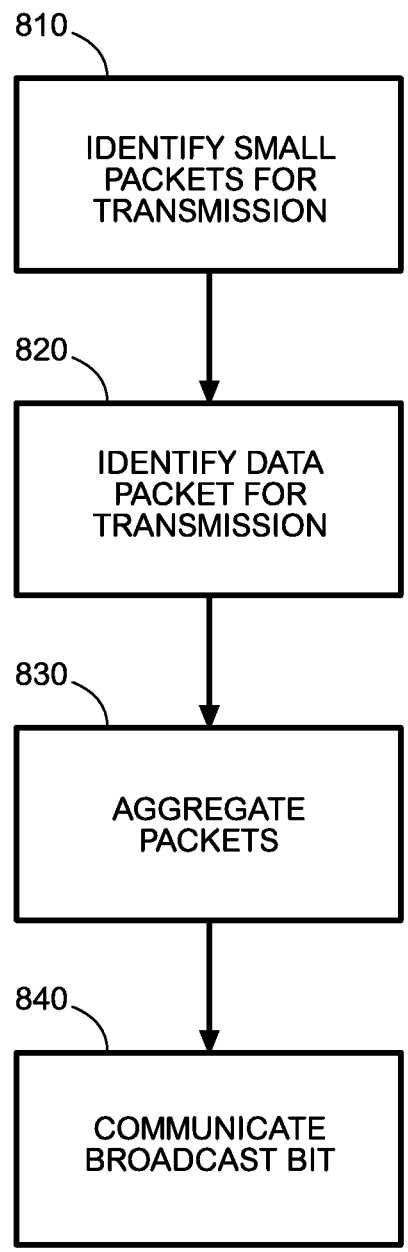
FIG. 8 illustrates a flow chart of embodiments of the present invention.

FIG. 8 is a flowchart illustrating operation of embodiments of the present invention. The method may start at step 810, where control packets and/or acknowledgement packets waiting for transmission by a node may be identified. In some embodiments, the control packets may be reservation requests. In some embodiments, the priority of the nodes may not be considered prior to attempting aggregation.

Once the control packets and/or acknowledgement packets have been identified, the method may proceed to step 820 where a separate packet, such as a data packet awaiting transmission, may be identified. After identification of the data packet, or other packet awaiting transmission, the method may proceed to step 830 where the control packets and/or acknowledgement packets may be aggregated with the data packet. In some embodiments the aggregating node may be a network controller.

In some embodiments, the other packet may be an Ethernet PDU packet. The Ethernet PDU packets may be less than or equal to 252 bytes. Before attempting aggregation, it may be determined whether the node on the network is capable of packet aggregation and capable of transmitting Ethernet PDU packets.

After aggregation of packets at step 830, the method may proceed to step 840 where the aggregating node may communicate a broadcast bit to indicate whether the network is operating in broadcast or unicast mode. Prior to communication of the broadcast bit, performance difference between potential unicast and broadcast modes may be determined.

Prior MoCA solutions may not allow for simultaneous operation of multiple MoCA networks on the same coax plant without explicit planning and configuration. For example, a service provider may deploy multiple MoCA networks in the home. This currently requires that the devices be manufactured for operation on two particular physical channels. However, such a solution may make the deployment of multiple networks with retail consumer-installed devices untenable. For the service provider to successfully allow for two networks on the D band of MoCA, the D band may need to be divided into two bands, one for service provider devices and one for consumer-installed devices.

For OSP devices, the service provider may additionally require additional filtering in each of the deployed devices to mitigate potential interference into the subband for consumer-installed devices. Thus, all consumer-installed devices may be required to implement filtering in order to prevent interference into the service provider subband. To avoid these issues, a single channel may be utilized which may allow multiple networks to operate on the physical channel. These networks may be considered "virtual" MoCA networks and may be logical partitions of the full MoCA network as opposed to physical partitions.

In some embodiments of the present invention, a single channel may be utilized to allow for multiple networks to operate on the channel. The multiple networks may be logical partitions of the full MoCA network. A device may act as the network coordinator for each of these "virtual" networks. The network coordinator may send a single beacon providing information for all virtual networks. In some embodiments, the network coordinator may send one beacon for each virtual network. The segregation of service provider devices and consumer-installed devices may be managed without service provider information.

The network coordinator may provide for two virtual networks where one may be password secured and consists of all of the service provider devices and one which may be open and consists of all of the consumer-installed devices. The network coordinator may allocate bandwidth to each virtual network based on the rules established by the service provider. The network coordinator may be a member of both virtual networks and may control the bandwidth allocation to each virtual network. All devices may then operate on a single channel. In some embodiments, the channel may be of a pre-determined bandwidth.

Each device on the service provider sub-band may be capable of communicating with one another. Likewise, each device on the consumer-installed devices network may be capable of communicating with one another. The OSP rules may define the rules of communication between service provider devices and consumer-installed devices.

The service provider virtual network ("OSP network") may be formed by the service provider to afford distribution of premium content in the home. The OSP network may be required to be private. Each service provider device may be configured to be knowledgeable of the privacy method employed to allow for communications between one another. The active network coordinator may be a super node capable of communication with all nodes on the MoCA network. In some embodiments, any service provider device may be configured to communicate with consumer-installed devices. As such, data may be transferred directly or through the network coordinator as a bridge.

The consumer-installed devices virtual network ("home network") may be formed of consumer devices placed on a coax plant in the home. The home network may or may not be private based on the consumer's configuration. Home devices may communicate with the network coordinator by monitoring beacons, participating in advanced communication functions (ACFs) as indicated by the network coordinator and then participating in steady-state operation and LMOs.

As all devices may be on the same channel, communication decisions may be made by the active network coordinator. A service provider may configure the service provider devices on the OSP network to communicate with the nodes on the home network. The amount of bandwidth dedicated to the home network may also be controlled by the network coordinator. For example, the network coordinator may limit the number of transmission opportunities allocated to the home network. In some embodiments, the network coordinator may limit the percentage of network throughput allocated to the home network.

Figure 9:
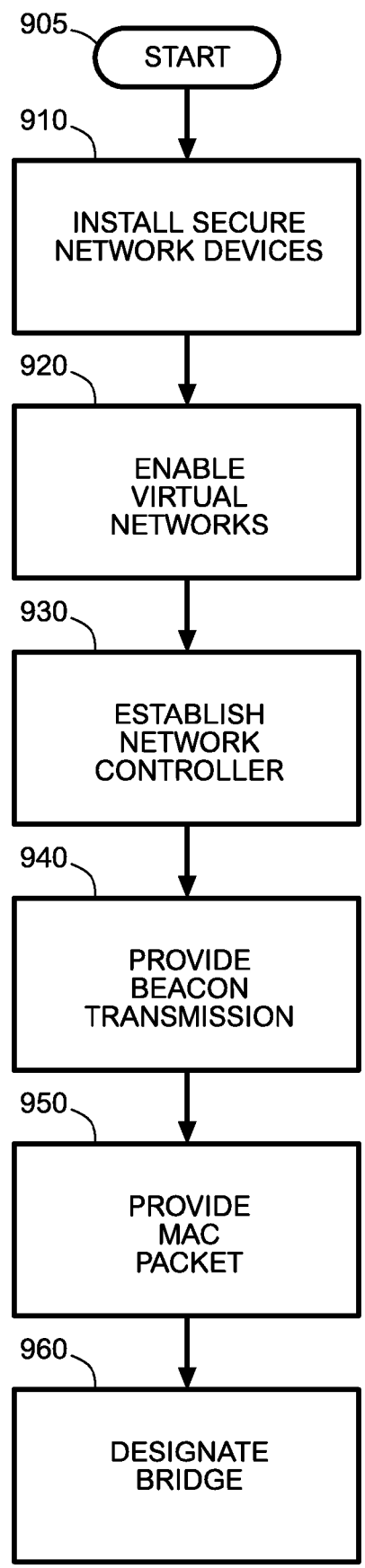
FIG. 9 illustrates a flow chart of embodiments of the present invention.

FIG. 9 illustrates a flow chart for embodiments of the invention. The method may start at step 905 when it may be desired to form an OSP network. The method may then proceed to step 910. At step 910, secure network devices may be installed. The secure network devices may be installed as password protected. The method may then proceed to step 920 where virtual MoCA networks may be enabled.

At step 920, the virtual networks may ensure that the appropriate control messages are transmitted to allow discovery of the network and node admission requests. Once the virtual networks are enabled at step 920, the method may proceed to step 930, where a network coordinator may be established. A single MoCA device may act at the network coordinator for all virtual networks on the same MoCA level. The network coordinator may change over the course of operation by hand-over and fail-over mechanisms. It may be ensured that only service provider devices are selected as network coordinators by ensuring that the device is part of the OSP network.

The method may then proceed to step 940, where the network coordinator may provide a beacon transmission. In some embodiments, one beacon may be transmitted per beacon service interval. The beacon format may be modified to provide all information needed for each node on the MoCA channel. In some embodiments, the network coordinator may utilize one ACF per beacon service interval. This may be regardless of the number of virtual networks on the MoCA channel.

The network coordinator may attempt to decode any ACF in each encryption state active on the network. For example, with a secure OPS network and an unsecure home network, the network coordinator may attempt to decipher the received ACF without encryption and with encryption according to the service provider password and state. If the ACF is decoded in unencrypted mode, the device may be requesting to join the home network. If the ACF is decoded in encrypted mode, the device may be requesting to join the OSP network.

Once a beacon transmission may be provided in step 940, the method may proceed to step 950 where a MAP packet may be provided by the network coordinator for the MoCA channel. Only one MAP packet may be provided regardless of the number of virtual networks on the channel. The MAP packet may contain a section for each virtual network where the transmission opportunities for the next cycle may by identified. The segments may be encrypted according to the privacy state for the associated virtual network.

After the MAP packet is provided, the method may proceed to step 960. At step 960 a service provider device may be designated as the bridge between the OSP network and the home network.

Figure 10:
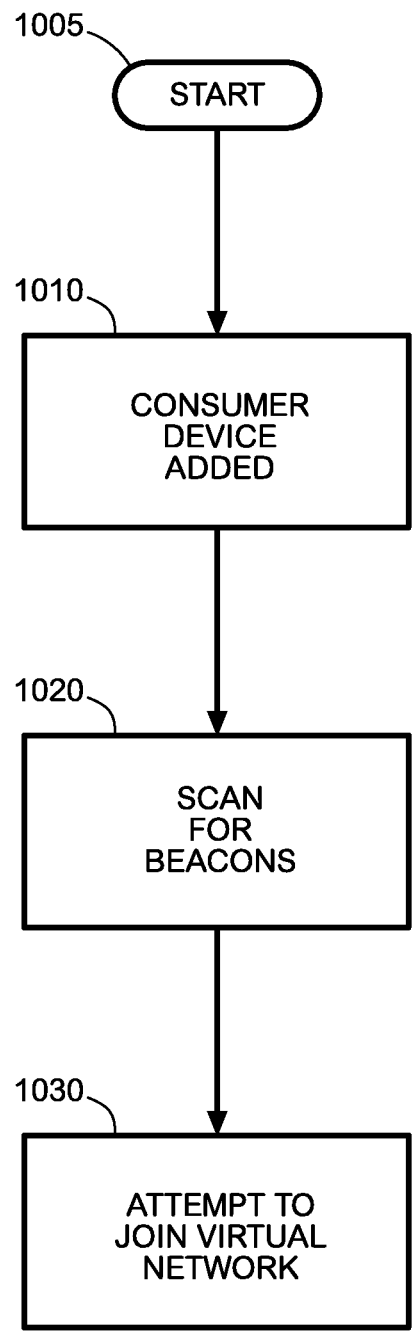
FIG. 10 illustrates a flow chart of embodiments of the present invention.

FIG. 10 illustrates a flow chart for embodiments of the invention. The method may start at step 1005 when it may be desired to form a home network. At step 1010, a consumer installed device may be added to the coax plant. The coax plant may have its own security settings. The method may then proceed to step 1020. At step 1020, the consumer installed device may scan for beacons on all available channels. In some embodiments, the consumer-installed device may search all channels for a single beacon containing the relevant information. When the beacon is found, the consumer-installed device may determine the location of the ACF and MAP.

Once a beacon is located the method may proceed to step 1030 where the consumer-installed device may attempt to join a virtual network on one of the MoCA channels. The consumer installed device may attempt to join each network for which it received ACF information. In some embodiments, the consumer-installed device may characterize the bidirectional links between itself and other nodes on the network. For example, links may be characterized as being between the consumer-installed device and the network coordinator; between the consumer-installed device and the bridge node; and between consumer-installed device and all other available nodes on the virtual network.

After the virtual network is formed, the network coordinator may maintain the rules established by the service provider for the home network. The rules may limit the number of transmission opportunities, signal transfer points (STPs), and/or the allocation of a percentage of network throughput. In some embodiments, the service provider may configure nodes on the secure network as bridges to consumer device resident behind a node (e.g., televisions).

Figure 11:
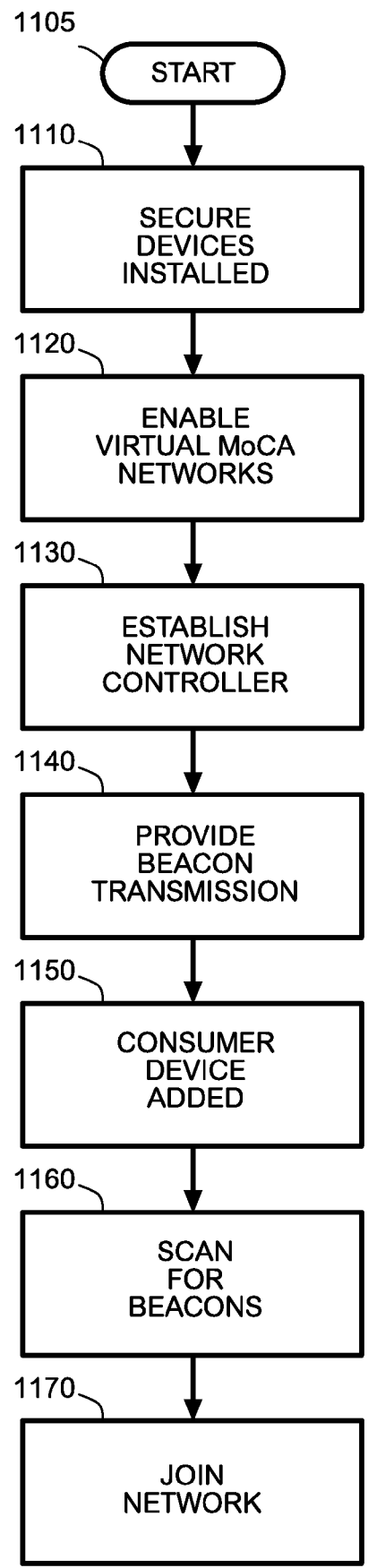
FIG. 11 illustrates a flow chart of embodiments of the present invention.

FIG. 11 illustrates a flow chart of embodiments of the present invention. The method may start at step 1105 when a virtual OSP network is desired utilizing separate control planes. At step 1110, secure network devices may be installed. The secure network devices may be installed and password protected. The method may then proceed to step 1120 where virtual MoCA networks may be enabled.

At step 1120, the virtual networks may ensure that the appropriate control messages are transmitted to allow discovery of the network and node admission requests. Once the virtual networks are enabled at step 1120, the method may proceed to step 1130, where a network coordinator may be established. A single MoCA device may act at the network coordinator for all virtual networks on the same MoCA level. The network coordinator may change over the course of operation by hand-over and fail-over mechanisms. It may be ensured that only service provider devices are selected as network coordinators by ensuring that the device is part of the OSP network.

The method may then proceed to step 1140, where the network coordinator may provide a beacon transmission. In some embodiments, one beacon may be transmitted per beacon service interval. The beacon format may be modified to provide all information needed for each node on the MoCA channel. In some embodiments, the network coordinator may utilize one ACF for each virtual MoCA network resident on the MoCA channel. This may avoid service provider devices from competing against non-service provider devices for ACF intervals. The network coordinator may decode any ACF in the encryption state corresponding with the network for which the interval was allocated. For example, if time t1 may be allocated as the ACF for the secure network, any ACF received at t1 may be decoded with the associated Data Encryption Standard (DES) password and state.

A MAP packet may be transmitted per virtual MoCA network on the MoCA channel per MAP cycle. A service provider device may be declared the bridge between the OSP network and the home network. At step 1150 a consumer device may be added to a coax plant. Once the consumer device has been added, the method may proceed to step 1160.

At step 1160 the consumer device may scan for beacons on all usable channels. The consumer device may search for multiple beacons on each MoCA channel, one for each network on the MoCA channel. Once redundant information may be captured from a beacon (i.e., receiving the same beacon more than once), then all of the relevant information concerning the network may have been obtained.

After the network information has been compiled, the method may proceed to step 1170. At step 1170, the consumer device may attempt to join a located network. In some embodiments, the consumer device may attempt to join each network for which it received ACF information. In some embodiments, a pre-determined process may be employed to determine which of multiple open networks the consumer device will choose. In some embodiments, the consumer device may request a user to select the MoCA network the device should attempt to join.

In some embodiments, the consumer-installed device may characterize the bidirectional links between itself and other nodes on the network. For example, links may be characterized as being between the consumer-installed device and the network coordinator; between the consumer-installed device and the bridge node; and between consumer-installed device and all nodes on the virtual network.

After the virtual network is formed, the network coordinator may maintain the rules established by the service provider for the home network. The rules may limit the number of transmission opportunities, STPs, and/or the allocation of a percentage of network throughput. In some embodiments, the service provider may configure ENs on the secure network as bridges to consumer device resident behind a node (e.g., televisions).

Embodiments of the present invention may be embodied in any computer-readable medium for use by or in connection with an instruction execution system, apparatus, or device. Such instruction execution systems may include any computer-based system, processor-containing system, or other system that can fetch and execute the instructions from the instruction execution system. In the context of this disclosure, a "computer-readable medium" can be any means that can contain, store, communicate, propagate, or transport the program for use by, or in connection with, the instruction execution system. The computer readable medium can be, for example but not limited to, a system or that is based on electronic, magnetic, optical, electromagnetic, infrared, or semiconductor technology.

Specific examples of a computer-readable medium using electronic technology would include (but are not limited to) the following: random access memory (RAM); read-only memory (ROM); and erasable programmable read-only memory (EPROM or Flash memory). A specific example using magnetic technology includes (but is not limited to) a portable computer diskette. Specific examples using optical technology include (but are not limited to) compact disk (CD) and digital video disk (DVD).

Any software components illustrated herein are abstractions chosen to illustrate how functionality may be partitioned among components in some embodiments of the present invention disclosed herein. Other divisions of functionality may also be possible, and these other possibilities may be intended to be within the scope of this disclosure. Furthermore, to the extent that software components may be described in terms of specific data structures (e.g., arrays, lists, flags, pointers, collections, etc.), other data structures providing similar functionality can be used instead.

Any software components included herein are described in terms of code and data, rather than with reference to a particular hardware device executing that code. Furthermore, to the extent that system and methods are described in object-oriented terms, there is no requirement that the systems and methods be implemented in an object-oriented language. Rather, the systems and methods can be implemented in any programming language, and executed on any hardware platform.

Any software components referred to herein include executable code that is packaged, for example, as a standalone executable file, a library, a shared library, a loadable module, a driver, or an assembly, as well as interpreted code that is packaged, for example, as a class. In general, the components used by the systems and methods of reducing media stream delay are described herein in terms of code and data, rather than with reference to a particular hardware device executing that code. Furthermore, the systems and methods can be implemented in any programming language, and executed on any hardware platform.

The flow charts, messaging diagrams, state diagrams, and/or data flow diagrams herein provide examples of the operation of systems and methods of reducing media stream delay through independent decoder clocks, according to embodiments disclosed herein. Alternatively, these diagrams may be viewed as depicting actions of an example of a method. Blocks in these diagrams represent procedures, functions, modules, or portions of code which include one or more executable instructions for implementing logical functions or steps in the process.

Alternate implementations may also be included within the scope of the disclosure. In these alternate implementations, functions may be executed out of order from that shown or discussed, including substantially concurrently or in reverse order, depending on the functionality involved. The foregoing description has been presented for purposes of illustration and description. It is not intended to be exhaustive or to limit the disclosure to the precise forms disclosed. Obvious modifications or variations are possible in light of the above teachings. The implementations discussed, however, were chosen and described to illustrate the principles of the disclosure and its practical application to thereby enable one of ordinary skill in the art to utilize the disclosure in various implementations and with various modifications as are suited to the particular use contemplated. All such modifications and variation are within the scope of the disclosure as determined by the appended claims when interpreted in accordance with the breadth to which they are fairly and legally entitled.

What is claimed is:

1. A method of operating a Multimedia over Coax (MoCA) network, comprising:
   aggregating packets, including at least MoCA control packets and MoCA acknowledgement packets, with other packets; and
   determining whether to transmit the aggregated packets in one of: a unicast transmission mode and a broadcast transmission mode based on the efficiency of each transmission mode in transmitting the aggregated packets to at least one destination in the MoCA network, wherein the efficiency is the fraction of a plurality of available MAP cycles operating on the MoCA network that are dedicated to data transmission, wherein each available MAP cycle comprises a MAP packet.

2. The method of claim 1, wherein the other packets are Ethernet Protocol Data Unit (PDU) packets.

3. The method of claim 2, wherein the Ethernet (PDU) packets are less than or equal to 252 bytes.

4. The method of claim 1, wherein the control packets are reservation requests.

5. The method of claim 2, further comprising:
   determining whether a selected node on the network is capable of packet aggregation and capable of transmitting Ethernet (PDU) packets.

6. The method of claim 1, wherein the aggregation is preformed by a network controller.

7. The method of claim 6, wherein the aggregation is performed regardless of priority.

8. A method of operating a Multimedia over Coax (MoCA) network, comprising:
   aggregating MoCA control packets and small Ethernet Protocol Data Unit (PDU) packets; and
   determining a transmission mode for the aggregated packets based on a quantity of destinations for the aggregated packets, the determined transmission mode being one of the following: a unicast transmission mode and a broadcast transmission mode based on the efficiency of each transmission mode in transmitting the aggregated packets to at least one destination in the MoCA network, wherein the efficiency is the fraction of a plurality of available MAP cycles that are dedicated to data transmission wherein each available MAP cycle comprises a MAP packet.

9. The method of claim 8, wherein the control packets are reservation requests.

10. The method of claim 8, further comprising aggregating packets without regard for packet priority.

11. The method of claim 8, wherein the aggregation is preformed by a network controller.

12. The method of claim 11, further comprising: determining performance difference between potential unicast and broadcast modes.

13. The method of claim 11, wherein the network controller acts as a relay node when sending TCP traffic.

14. A system comprising:
   a first node on a MoCA network;
   a second node on a MoCA network;
   a network controller in communication with the first node and the second node capable of aggregating packets, including at least MoCA control packets and acknowledgement packets, with other packets destined for either the first node or the second node;
   determining whether the aggregated packets are destined for one of the following: the first node, the second node, and both the first node and the second node; and
   when the aggregated packets are destined for both the first node and the second node, determining a most efficient transmission mode for the aggregated packets from the following transmission modes: a unicast transmission mode and a broadcast transmission mode, wherein the efficiency is the fraction of a plurality of available MAP cycles that are dedicated to data transmission wherein each available MAP cycle comprises a MAP packet.

15. The system of claim 14, wherein the control packets are reservation requests.

16. The system of claim 14, wherein the network controller determines whether the first node and second node are capable of packet aggregation.

17. The system of claim 16, wherein the network controller is selected by a network operator from a plurality of nodes on the MoCA network.

18. The system of claim 17, wherein the network controller aggregates packets without regard for packet priority.

19. The system of claim 16, wherein the network controller is capable of communicating a broadcast bit to alert the first and second node as to whether transmissions are broadcast or unicast.

20. The system of claim 14, wherein the control packets are acknowledgements.

* * * * *